(No Model.) 3 Sheets—Sheet 3.

W. M. WILSON.
SEED COTTON CLEANER.

No. 401,092. Patented Apr. 9, 1889.

WITNESSES:
Donn Twitchell
C. Sedgwick

INVENTOR:
W. M. Wilson
BY Munn &Co
ATTORNEYS.

UNITED STATES PATENT OFFICE.

WILLIAM MORRIS WILSON, OF FRIAR'S POINT, MISSISSIPPI, ASSIGNOR OF ONE-HALF TO WILLIAM HENRY DICKERSON, OF SAME PLACE.

SEED-COTTON CLEANER.

SPECIFICATION forming part of Letters Patent No. 401,092, dated April 9, 1889.

Application filed November 1, 1888. Serial No. 289,695. (No model.)

*To all whom it may concern:*

Be it known that I, WILLIAM MORRIS WILSON, of Friar's Point, in the county of Coahoma and State of Mississippi, have invented a new and Improved Seed-Cotton Cleaner, of which the following is a full, clear, and exact description.

My invention relates to an improvement in cotton-cleaners, and has for its object to provide a machine into which the seed-cotton will be drawn from a store-house, wagon, or other point by suction, and wherein the cotton will be thoroughly cleaned in the machine from sand, dust, and other foreign substances and discharged therefrom without passing through the fan.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1:
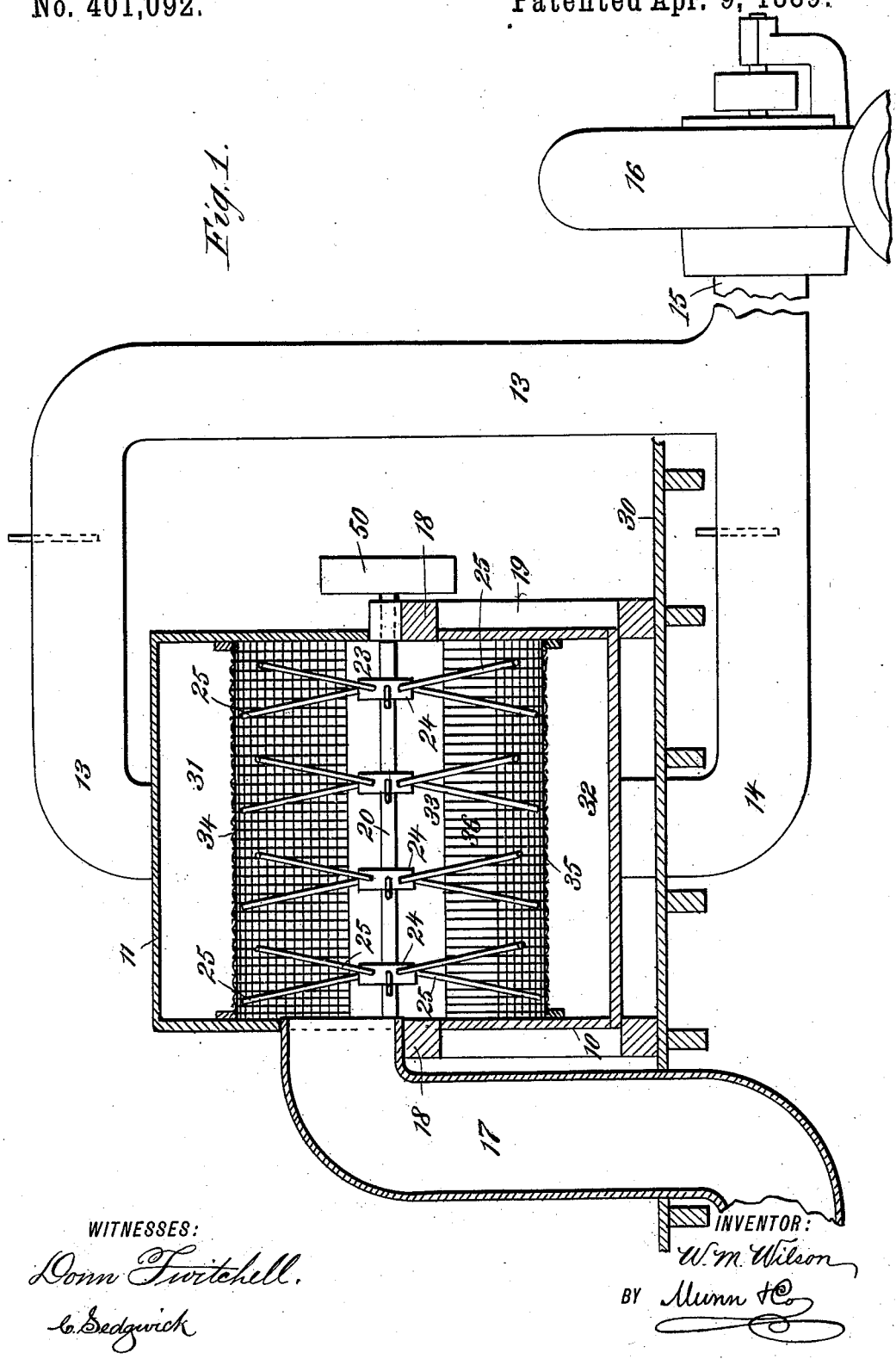
Figure 2:
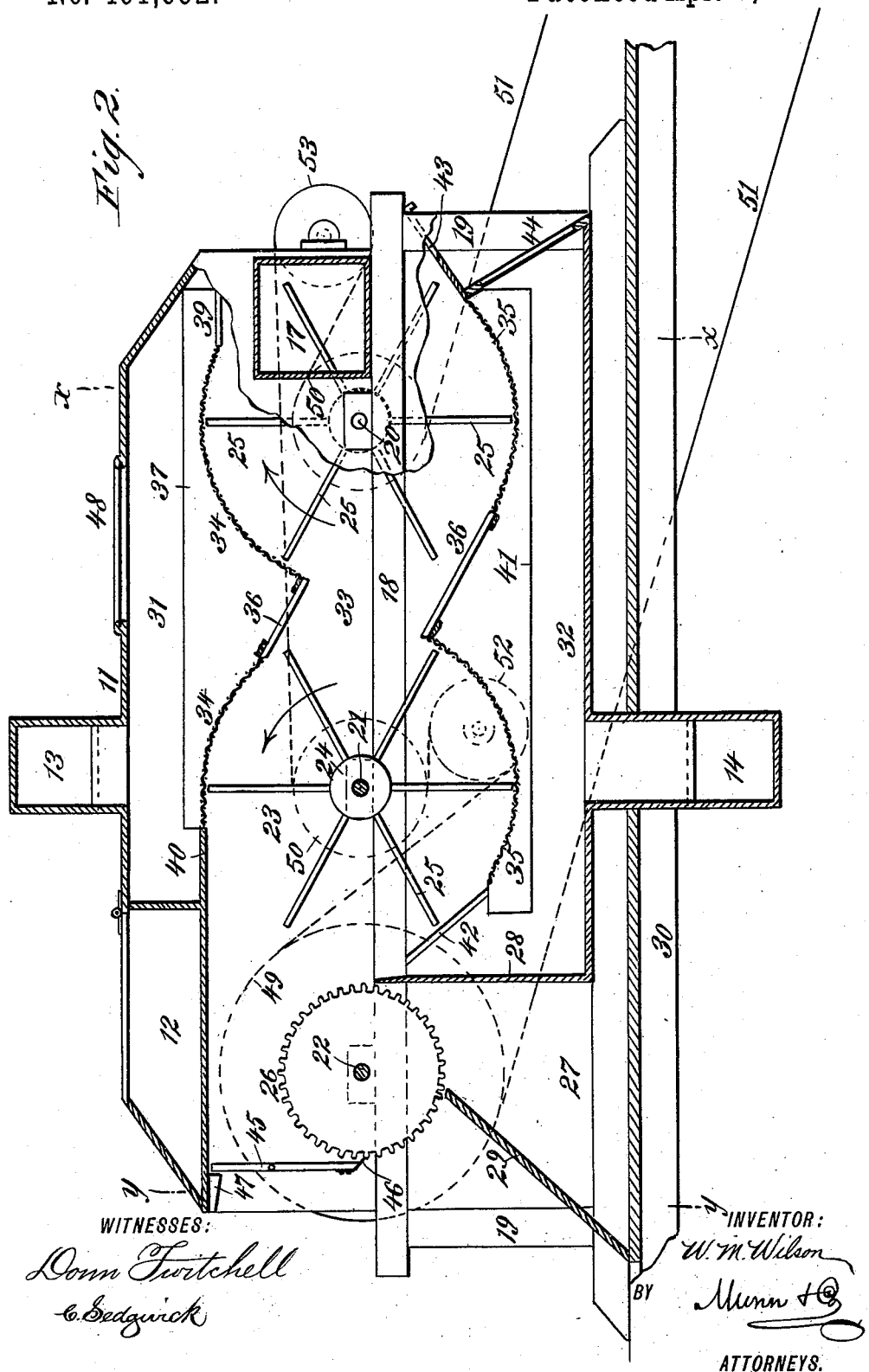
Figure 3:
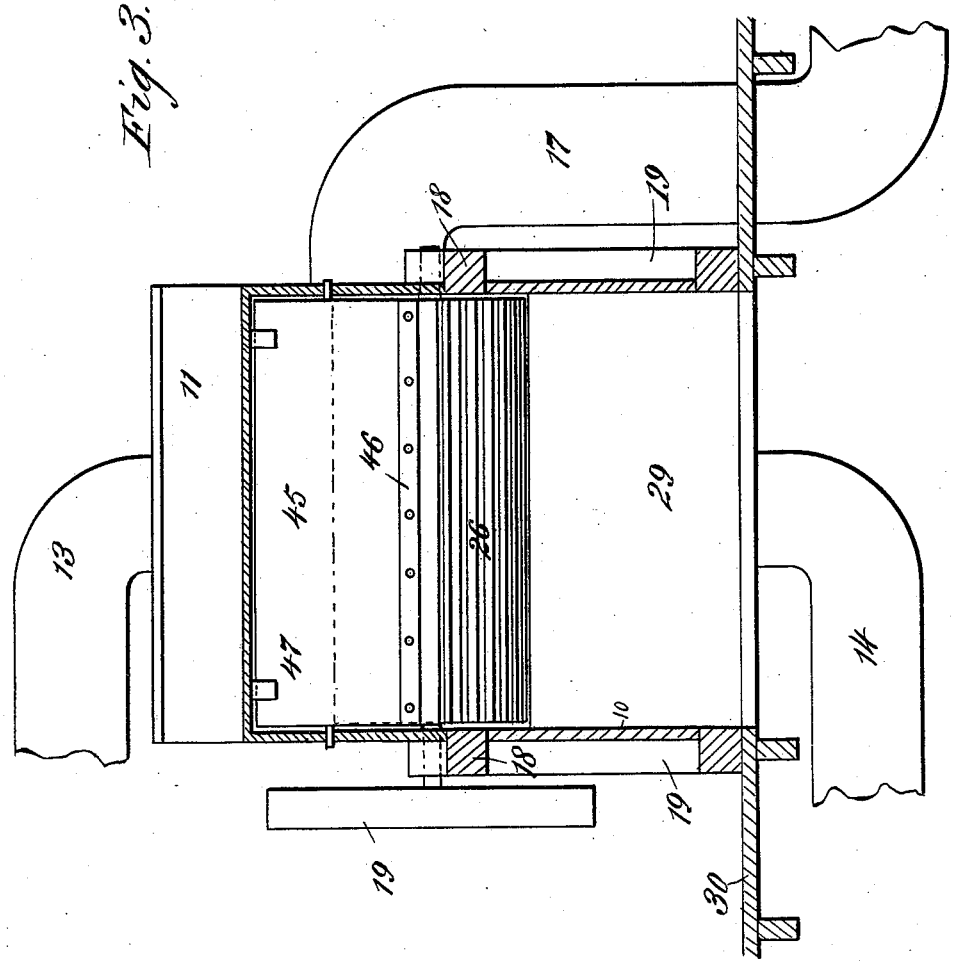

Figure 1 is a transverse section on line $x\,x$ of Fig. 2, parts being in elevation. Fig. 2 is a longitudinal vertical section through the entire machine, a part being in elevation. Fig. 3 is a transverse section on line $y\,y$ of Fig. 2, parts being in elevation.

In the accompanying drawings, 10 denotes a rectangular box or receptacle, which is suitably held in place by the supporting-beams of the main frame, as shown. Extending over the top of the receptacle 10 is a detachable lid or cover, 11, in which cover, at the rear end, a lidded compartment, 12, is formed adapted to receive the tools or other implements.

From the bottom of the box-like receptacle 10, and from the cover 11 tubes 13 and 14 are respectively carried to the side, and the top tube is united to the bottom tube, preferably below the support of the receptacle 10, as best shown in Fig. 1, in a single pipe, 15, at the extremity of which pipe an exhaust-fan, 16, is attached.

The inner ends of the tubes 13 and 14 are preferably in vertical alignment, and a third tube, 17, is carried from the side of the receptacle to a connection with the wagon, storehouse, or inclosure containing the cotton to be cleaned.

Beams 18 are longitudinally secured to the sides of the receptacle 10, at or near the center, braced by suitable standards, 19, and a series of spaced shafts, 20, 21, and 22, are journaled upon the said beams in any approved manner, which shafts pass transversely through the receptacle.

A series of beaters, 23, are secured upon the forward and intermediate shafts, 20 and 21, consisting, respectively, of a hub, 24, keyed or otherwise attached to the shafts, and a series of arms, 25, radiating from said hub, each alternate arm having a sheer in an opposite direction, as best shown in Fig. 1. The rear shaft, 22, is made to carry a corrugated or fluted delivery-cylinder, 26, which cylinder may be of other equivalent construction, or be replaced by a brush.

The front end of the upper portion of the receptacle 10 is entirely closed above the central beams, 18, the equivalent portion of the rear end being preferably left open, and the rear end of the receptacle 10, below the beams, is provided with a chamber, 27, in which a portion of the cylinder 26 revolves, the forward wall of the chamber consisting of a transverse partition, 28, extending from the bottom of the receptacle vertically upward to the height of the beams 18, as best shown in Fig. 2.

Within the recess 27 a partition or slide, 29, is made to rest upon the floor or support 30 of the machine and extend upward at a forward inclination to a point preferably immediately below the center of the cylinder 26, the said slide or partition being attached to the sides of the receptacle.

The interior of the receptacle is divided into three compartments, 31, 32, and 33, the upper and lower compartments, 31 32, being respectively connected with the exhaust-tubes 13 and 14, and being designed to receive the dust or other foreign substance expelled from the cotton. The central compartment, 33, is connected with the delivery-tube 17, and is to receive the seed-cotton, which is to be propelled through the said compartment by the beaters, and to be delivered therefrom by the cylinder 26 to the slide or partition 29. This division into compartments is effected by upper and lower screen-like partitions, 34 and 35, attached transversely of the receptacle 10 above and below the forward and rear beaters, the contiguous edges of the screens being united by a series of inclined bars, 36, or perforated metal plates, as best illustrated in Figs. 1 and 2. The upper united screens are attached to the cover and may be removed therewith, being attached at their sides to battens 37, as best shown in Fig. 2. The forward extremity of the forward upper screen is secured to that end of the cover by horizontal bars or perforated metal plates 39, and the rear extremity of the rear upper screen is fastened to a horizontal projection, 40, integral with the bottom of the tool-compartment. The lower screens are attached to the body of the receptacle by battens 41, and from the rear end of the said battens 41 bars or perforated metal plates 42 are projected rearwardly and upwardly to about the height of the beams 18.

The forward end of the receptacle below the beams 18 is closed by an inclined sliding door, 43, one end whereof normally rests upon the forward extremity of the lower battens, 41, and a loose glass door, 44, also resting against the battens and upon the floor of the receptacle, the latter door being retained in position by suction.

A vertical gate or gravity air-valve, 45, provided with trunnions, preferably above the center, is pivoted in the rear upper end of the receptacle within the central compartment, immediately to the rear of the cylinder 26, and the said gate or valve, if desirable, may have attached to the lower end a flexible apron, 46, normally in contact with the cylinder, as best shown in Figs. 2 and 3. The rearward movement of the gate or valve is limited at the upper end by stops 47, the lower end being free to move outward. In the cover of the receptacle one or more glass panes, 48, are preferably inserted, whereby the interior mechanism may be conveniently perceived.

The beater-shafts 20 and 21 are revolved in opposite directions, as indicated by arrows, Fig. 2, and the cylinder-shaft 22 moves in the same direction as the shaft 21. The shafts are ordinarily driven from the left-hand side, facing the rear, a large pulley, 49, being secured to the cylinder-shaft and smaller pulleys, 50, of equal size, to the beater-shafts. The belt 51 from a line-pulley suitably situated is passed from beneath over the pulley 49, around an idler, 52, over the pulley upon the central shaft, forward over a second idler, 53, and rearward over the pulley upon the forward shaft to the line-pulley. I do not, however, confine myself to this arrangement of the belts, as the same may be varied indefinitely.

In operation the cotton is drawn by the exhaust-fan from the repository into the machine at right angles with the forward beaters, which carry it downward and along the lower screen, freeing the cotton from heavy sand, &c., which escapes through the screen into the lower compartment. The cotton is then thrown against the rear beaters above their axis, and by them thrown in turn against and along the top screen, permitting any remaining dust or impurities to escape above, and the cotton is finally cast upon the cylinder and carried out past the air gate or valve and discharged from the machine.

Having thus described my invention, what I claim as new, and desire to secure by Letters Patent, is—

1. The combination, with a receptacle provided with longitudinal spaced screens dividing the receptacle into three compartments, a supply-tube entering the central compartment near the front end thereof, and exhaust-tubes connecting with the upper and lower compartments, of a series of rotary beaters in the central compartment, and a delivery-cylinder adjacent to the discharge end of said compartment, substantially as shown and described.

2. The combination, with a receptacle provided with longitudinal spaced screens dividing the receptacle into three compartments, a supply-tube entering the central compartment near the front end thereof at a right angle, and exhaust-tubes connected with the upper and lower compartments, of shafts within the central compartment, provided with beaters, said shafts capable of revolving in opposite directions, means, substantially as shown, for revolving said shafts, as described, and a delivery-cylinder having a roughened periphery journaled in the main frame and adjacent to the discharge end of the central compartment, all combined to operate substantially as shown and described.

3. The combination, with a receptacle provided with longitudinal spaced screens dividing the same into three compartments, a supply-tube entering the central compartment near the front end thereof, and exhaust-tubes connected with the lower and upper compartments, of a series of beaters journaled in the central compartment, a delivery-cylinder journaled in the main frame at the rear or discharge end of the central compartment, and a gravity air-valve pivoted at the rear of the cylinder in the outlet of the receptacle, substantially as shown and described.

4. The combination, with a receptacle provided with longitudinal spaced screens dividing the receptacle into three compartments, a supply-tube entering the central compartment near the front end thereof at a right angle thereto, and exhaust-tubes connecting with the upper and lower compartments, of shafts provided with arms journaled in the central compartment, capable of revolving in opposite directions, means, substantially as shown, for revolving said shafts, a corrugated delivery-cylinder journaled in the main frame at the discharge end of said compartment, and a gravity air-valve pivoted at the rear of the cylinder in the outlet of the receptacle, substantially as shown and described.

5. The combination, with a receptacle provided with longitudinal spaced screens dividing the receptacle into three compartments, a supply-tube entering the central compartment near the front end thereof, and exhaust-tubes connected with the upper and lower compartments, of oppositely-revolving shafts journaled transversely in the central compartment, hubs attached to said shafts, and beater-arms projecting from the hubs, alternately flaring in opposite directions, means for operating said shafts, as described, a roughened delivery-cylinder journaled in the main frame at the discharge end of the said compartment, and a gravity air-valve pivoted at the rear of the cylinder and in the outlet of the receptacle, all combined substantially as shown and described.

WILLIAM MORRIS WILSON.

Witnesses:
  A. M. LITTLEJOHN,
  JOE OGLETREE.